United States Patent
Li et al.

(10) Patent No.: US 7,120,703 B2
(45) Date of Patent: Oct. 10, 2006

(54) TRANSFORMING DATA AUTOMATICALLY BETWEEN COMMUNICATIONS PARTIES IN A COMPUTING NETWORK

(75) Inventors: Yongcheng Li, Raleigh, NC (US); Sajan Sankaran, Raleigh, NC (US); Spencer H. Shepard, IV, Durham, NC (US); Yih-Shin Tan, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/059,165

(22) Filed: Feb. 16, 2005

(65) Prior Publication Data

US 2005/0144557 A1    Jun. 30, 2005

Related U.S. Application Data

(62) Division of application No. 09/907,853, filed on Jul. 17, 2001, now Pat. No. 6,961,760.

(51) Int. Cl.
G06F 13/00    (2006.01)

(52) U.S. Cl. .................. 709/246; 709/206; 709/219

(58) Field of Classification Search ............. 709/206, 709/217, 219, 246; 719/319, 329
See application file for complete search history.

(56) References Cited

U.S. PATENT DOCUMENTS

| | | | |
|---|---|---|---|
| 6,549,956 B1* | 4/2003 | Bass et al. ................. 719/328 |
| 6,589,291 B1 | 7/2003 | Boag et al. |
| 6,629,130 B1 | 9/2003 | Mertama et al. |
| 6,772,413 B1* | 8/2004 | Kuznetsov ................. 717/136 |
| 6,842,772 B1* | 1/2005 | Delaney et al. ............. 709/206 |
| 2001/0039540 A1* | 11/2001 | Hofmann et al. ............. 707/3 |
| 2002/0086661 A1* | 7/2002 | Rouse et al. ................ 455/412 |
| 2002/0099735 A1* | 7/2002 | Schroeder et al. .......... 707/513 |
| 2002/0120704 A1 | 8/2002 | Karp et al. |
| 2002/0120776 A1* | 8/2002 | Eggebraaten et al. ....... 709/246 |
| 2002/0169803 A1 | 11/2002 | Sampath et al. |
| 2002/0178211 A1 | 11/2002 | Singhal et al. |
| 2002/0188670 A1* | 12/2002 | Stringham ................. 709/203 |
| 2002/0194227 A1 | 12/2002 | Day et al. |
| 2003/0069975 A1* | 4/2003 | Abjanic et al. ............. 709/227 |

OTHER PUBLICATIONS

"Extricity B2B Solutions" *Extricity*. 2000. Jul. 11, 2001 <http://www.extricity.com/solutions/>. (1 page).

(Continued)

*Primary Examiner*—Viet D. Vu
(74) *Attorney, Agent, or Firm*—Jerry W. Herndon; Marcia L. Doubet

(57) ABSTRACT

Methods, systems, and computer program products for automatically transforming data or business messages to enable communication between parties in a distributed computing environment (e.g. between business partners who exchange data over a public network, and who do not necessarily use the same data formats), where this data transformation preferably occurs at the edge of the computing network. A set of transformation services is described, and include template registration, transformation, forward, and receive services. Services from this set may optionally be combined to create composite transformation services. A template defines how to transform one data format into another. Selection criteria may be provided to enable dynamically selecting a template at run-time. Using these services, one business partner simply hands its data off into the network to a network-accessible transformation service, where the data is automatically transformed into a format usable by its business partner and forwarded to that business partner.

20 Claims, 12 Drawing Sheets

OTHER PUBLICATIONS

"Extricity B2B for Enterprise" *Extricity*. 2000. Jul. 11, 2001 <http://www.extricity.com/solutions/enterprise_details.html>. (1 page).
"Ariba Solutions for Industry Verticals" *Ariba*. Jul. 11, 2001 <http://www.ariba.com/solutions/industry_sol.cfm>. (2 pages).
"Ariba Commerce Services Networks" *Ariba*. Jul. 11, 2001 <http://www.ariba.com/solutions/ariba_product.cfm?solutionid=9>. (1 page).
"E-Utilities" *IBM Corporation*. Jul. 11, 2001 <http://www.research.ibm.com/irl/projects/eutil/>. (1 page).
"E-marketplaces" *IBM Corporation*. Jul. 11, 2001 <http://www.research.ibm.com/irl/projects/market/>. (1 page).
"IBM India Research Lab (Intelligent Infrastructure)" *IBM Corporation*. Jul. 11, 2001 <http://www.research.ibm.com/irl/projects/infra.html>. (1 page).
"IBM India Research Lab (E-commerce)" *IBM Corporation*. Jul. 11, 2001 <http://www.research.ibm.com/irl/projects/ecom.html>. (1 page).

\* cited by examiner

```xml
<?xml version="1.0"?>

<xsl:stylesheet version="1.0" xmlns:xsl="http://www.w3.org/1999/XSL/Transform"
    xmlns="http://www.w3.org/1999/xhtml">

<xsl:output method="xml" indent="yes"
    doctype-system="http://www.w3.org/TR/xhtml1/DTD/xhtml1-strict.dtd"
    doctype-public="-//W3C//DTD XHTML 1.0 Strict//EN" />

<xsl:template match="/">
  <xsl:apply-templates/>
</xsl:template>

<xsl:template match="flights">
<html>
 <head>
  <title>Flight Schedule</title>
 </head>
 <body>
  <h1>Flight Schedule</h1>
  <xsl:apply-templates/>
  <h2>Flight Cancellation Policy:</h2>
  <p>
   <xsl:text>
     The flight cancellation policy is one that is approved by all major airlines belonging
     to the Air Transport Association Cointrin, Geneva, Switzerland, subcommittee on
     Flight Cancellations.
   </xsl:text>
  </p>
 </body>
</html>
</xsl:template>
```

FIG. 4B

```
<xsl:template match="flight">
  <xsl:apply-templates/>
</xsl:template>

<xsl:template match="number">
<p><b><xsl:apply-templates/></b></p>
</xsl:template>

<xsl:template match="dep">
  <xsl:text>Departing </xsl:text>
  <xsl:apply-templates/>
</xsl:template>

<xsl:template match="arr">
  <xsl:text>Arriving </xsl:text>
  <xsl:apply-templates/>
</xsl:template>

<xsl:template match="time">
  <xsl:text> at </xsl:text>
  <xsl:apply-templates/>
</xsl:template>

</xsl:stylesheet>
```

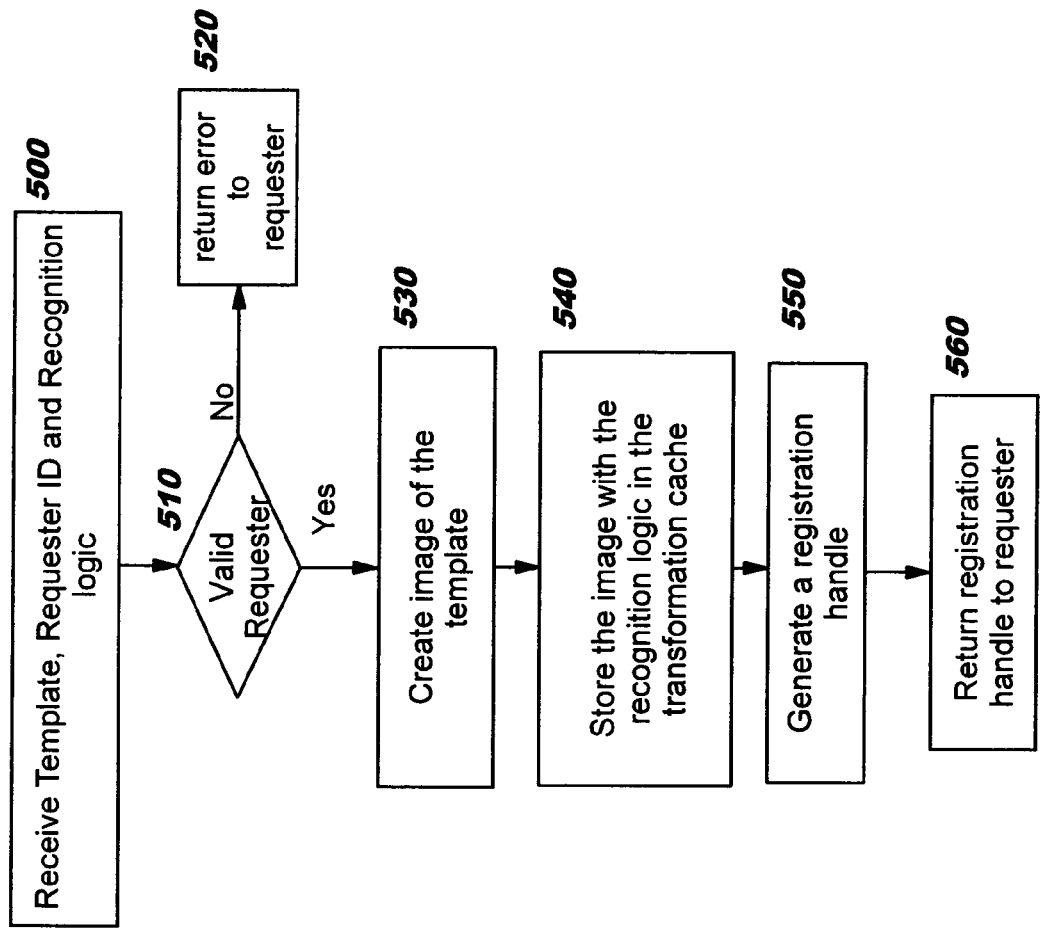

```
POST /soap/servlet/rpcrouter HTTP/1.0
Host: localhost
Content-Type: text/xml; charset=utf-8
Content-Length: 478
SOAPAction: "urn:registerService"

<?xml version='1.0' encoding='UTF-8'?>
<SOAP-ENV:Envelope xmlns:SOAP-ENV="http://schemas.xmlsoap.org/soap/envelope/"
    xmlns:xsi="http://www.w3.org/1999/XMLSchema-instance"
    xmlns:xsd="http://www.w3.org/1999/XMLSchema">
<SOAP-ENV:Body>           610
<ns1:registerStylesheet xmlns:ns1="urn:registerService"
    SOAP-ENV:encodingStyle="http://schemas.xmlsoap.org/soap/encoding/">
<stylesheetTemplate xsi:type="xsd:string">http://localhost/temp/XML2HTML.xsl</stylesheetTemplate>   620
<stylesheetID xsi:type="xsd:string">XML2HTML</stylesheetID>   630
<requesterID xsi:type="xsd:string">Administrator</requesterID>   640
</ns1:registerStylesheet>
</SOAP-ENV:Body>
</SOAP-ENV:Envelope>
```

```
HTTP/1.0
Content-Type: text/xml; charset=utf-8
Content-Length: 472
Set-Cookie2: JSESSIONID=1qwy4kuqg1;Version=1;Discard;Path="/soap"
Set-Cookie: JSESSIONID=1qwy4kuqg1;Path=/soap
Servlet-Engine: Tomcat Web Server/3.2.1 (JSP 1.1; Servlet 2.2; Java
1.3beta; Windows NT 5.0 x86; java.vendor=Sun Microsystems Inc.)

<?xml version='1.0' encoding='UTF-8'?>
<SOAP-ENV:Envelope xmlns:SOAP-ENV="http://schemas.xmlsoap.org/soap/envelope/"
                    xmlns:xsi="http://www.w3.org/1999/XMLSchema-instance"
                    xmlns:xsd="http://www.w3.org/1999/XMLSchema">
<SOAP-ENV:Body>                    660
<ns1:registerStylesheetResponse xmlns:ns1="urn:registerService"SOAP-ENV:encodingStyle=
                    "http://schemas.xmlsoap.org/soap/encoding/">
<stylesheetID xsi:type="xsd:string">XML2HTML</stylesheetID>
</ns1:registerStylesheetResponse>                    670
</SOAP-ENV:Body>
</SOAP-ENV:Envelope>
```

TRANSFORMING DATA AUTOMATICALLY BETWEEN COMMUNICATIONS PARTIES IN A COMPUTING NETWORK

Related Invention

The present invention is a Divisional of commonly-assigned U.S. Pat. No. 6,961,760 Ser. No. 09/907,853, filed on Jul. 17, 2001), which is titled "Transforming Data Automatically Between Communications Parties in a Computing Network" and which is hereby incorporated herein by reference.

BACKGROUND OF THE INVENTION

1. Field of the Invention

The present invention relates to computer programming, and deals more particularly with methods, systems, and computer program products for automatically transforming data to enable communication between parties in a computing environment (e.g. between business partners who exchange data over a public network, and who do not necessarily use the same data formats).

2. Description of the Related Art

The public Internet has grown into an e-Business platform (including business-to-business e-Commerce and e-Marketplace use) where it is common to exchange data and services electronically among parties of different network and system infrastructures. Participants in these electronic exchanges need fast and easy ways to make their programs communicate. However, many of these programs were independently developed, and might run on different operating systems and/or be written in different programming languages. Each participants' programs may be written to use data structures and application programming interfaces ("APIs") that are specific to that participant. The programs of the parties may therefore not interoperate well together in an e-Business environment. Because of the high cost of software development, it is not feasible to redesign and rewrite the programs such that they are specifically designed for interoperability with a business partner. It is therefore necessary to use existing software to the greatest extent possible. Furthermore, in business environments where parties need to exchange data and services with multiple business partners, developing, testing, and maintaining software adapted for communicating with each business partner would be extremely expensive, time-consuming, and difficult to coordinate.

One prior art technique for enabling the programs of business partners to communicate is to encode data using Extensible Markup Language ("XML") documents with an application-specific format which has been agreed upon between the participants using a particular application. This approach is often referred to as "XML Transformations". While this approach provides a level of interoperability and may provide a number of advantages over prior art techniques, solutions available today are intertwined with specific application architectures and are therefore not reusable. An example is Extricity B2B™ for Enterprise from Extricity, Inc. ("Extricity B2B" is a trademark of Extricity, Inc.) Extricity B2B for Enterprise comprises software components which have been designed to automate and synchronize the flow of data, and the execution of processes, among business partners for specific industries. Another example is the vertical industry solution approach (that is, industry-specific solutions) used by Ariba. (See http://www.extricity.com and http://www.ariba.com for more information on the products of these companies.)

Web services technology and e-Utilities are relatively new programming approaches which enable function reuse, but they are being explored in application-specific contexts (such as providing new e-mail solutions). Web services technology is a rapidly-emerging mechanism for distributed application integration. In general, a "web service" is an interface that describes a collection of network-accessible operations, and web services are typically designed to fulfill a specific task or a set of tasks. They may work with one or more other web services in an interoperable manner to carry out their part of a complex workflow or a business transaction. For example, completing a complex purchase order transaction may require automated interaction between an order placement service (i.e. order placement software) at the ordering business and an order fulfillment service at one or more of its business partners. Many industry experts consider the service-oriented web services initiative to be the next evolutionary phase of the Internet. With web services, distributed network access to software will become widely available for program-to-program operation.

The term "e-Utilities" refers to providing utility-like software offerings, whereby a company makes software functionality for a particular function or functions available to customers to electronically access on demand, as needed by the customer's in-house computing facilities. Providing software in this manner introduces a number of challenges. A discussion of such challenges, which include possible "remodeling" of applications to fit the utility paradigm, definition of a new programming model, and application distribution considerations, is provided by the International Business Machines ("IBM") India Research Lab on the Internet at http://www.research.ibm.com/irl/projects/eutil.

What is needed is an improved technique for allowing business partners to exchange data and business messages, without requiring software to be specially designed or rewritten for this purpose.

SUMMARY OF THE INVENTION

An object of the present invention is to provide a technique for transforming data (including business messages) automatically for interoperability between business partners in a distributed network.

Yet another object of the present invention is to provide data transformation services as distributed web services.

Another object of the present invention is to provide a technique that enables business partners to easily and efficiently exchange data and services (such as business messages) at run-time without writing code to perform specific partner-to-partner transformations.

A further object of the present invention is to provide a method for offloading the creation and maintenance of specific transformation logic used in partner-to-partner communications (such as Extensible Stylesheet Language Transformation, or "XSLT", style sheets) to a third-party service provider.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides methods, systems, and computer program products for automatically transforming data between communications parties in a computing network. In one aspect, this technique comprises: detecting that a data or business message transformation is needed; creating a structured document representing the data or business message; and sending a service request comprising the structured document to a network-accessible transformation service.

The technique may further comprise requesting delivery of a transformed document resulting from operation of the sent service request. The sent service request may specify a particular transformation to be performed on the structured document.

In another aspect, this technique comprises: providing a set of network-accessible data or business message transformation services; receiving service requests for selected ones of the set of services; and carrying out the received service requests. The set may include one or more of: registration of transformation templates, performing transformations, forwarding transformed documents, and receiving documents.

In this aspect, when the set includes a registration of transformation templates service, the receiving may further comprise receiving a registration request; the request may include a template to be registered or an address or identifier of such a template; and the carrying out further comprises carrying out the registration of the template.

Or in this aspect, when the set includes a document transformation service, the receiving may further comprise receiving a document transformation request; the request may include a document to be transformed or an address or identifier of such a document, and a template to be used in the transformation or an address or identifier of such a template; and the carrying out further comprises carrying out the transformation of the document. The identifier of the template may comprise one or more keyword/value pairs which may be used to select the template. Or, recognition logic may be used to examine the document in order to select a template to be used in the transformation. Note also that the document by itself could be the template identifier.

In this aspect, when the set includes a document forward service, the receiving may further comprise receiving a document forward request; the request may include a document to be forwarded or an address or identifier of such a document and a destination for forwarding the document; and the carrying out further comprises carrying out the forwarding of the document to the destination.

When the set includes a document receive service, the receiving may further comprise receiving a document receive request; the request may include an identifier of a document to be received or an identifier of a creator of such a document; and the carrying out further comprises carrying out the receiving of the document.

The service requests may be SOAP ("Simple Object Access Protocol") requests, or XML Protocol request, or other similar requests. Availability of the set of services may be advertised using UDDI ("Universal Description, Discovery, and Integration").

The templates may be specified using style sheets, or using software programs, or using other approaches.

Optionally, this aspect may further comprise validating a requester of each received service request, and each service request is preferably carried out only if the validation succeeds.

The present invention may also be used advantageously in methods of doing business, for example by offering automated data transformation services which may be used by customers or subscribers to facilitate electronic communications with their business partners, and/or by providing services to define transformation logic specifications for this purpose.

The present invention will now be described with reference to the following drawings, in which like reference numbers denote the same element throughout.

BRIEF DESCRIPTION OF THE DRAWINGS

FIGS. 4A and 4B (which together comprise FIG. 4) illustrate an example of a transformation logic specification referred to herein as a "template" or "template map" (which, in the example, is written in an XSLT style sheet) that may be used to define transformations which are to be provided according to the present invention;

FIGS. 5 and 7–10 provide flowcharts depicting logic which may be used to implement transformation services, according to preferred embodiments of the present invention; and FIGS. 6A and 6B illustrate examples of a request message invoking a web transformation service according to the present invention and a response message corresponding to execution of the service, respectively.

DESCRIPTION OF PREFERRED EMBODIMENTS

The present invention defines techniques for improving electronic communications between business partners by providing automated transformation services which can be accessed on demand, from the applications executing at the business partner's information technology ("IT") site. In this manner, a business's applications can communicate with those of its partners without requiring transformation logic to be written by each partner and without requiring the applications to be specifically adapted for the unique data formats of each potential business partner. The process of writing, testing, and maintaining application software for the core business transactions is therefore simplified and a company's IT professionals can then focus on these business transactions. Furthermore, when partner-to-partner transformation logic is removed from the core application, the code is more likely to be reusable as it is focused on the business at hand and not its external interfaces.

A data transformation service is provided, according to the present invention, which preferably operates at the edge of a network to register transformation logic specifications and to transform, forward, and/or receive structured documents. In preferred embodiments, the structured documents are encoded using XML. (Note that while preferred embodiments of the present invention are described herein as operating at the edge of a network, these techniques may also be adapted for use at other locations such as the front-end of a server farm or on a network appliance, as will be obvious to one of skill in the art. Furthermore, while preferred embodiments are described herein as pertaining to use with transformations that are provided as web services or e-Utilities, this is for purposes of illustration and not of limitation. The disclosed techniques may also be used provided as network-accessible services using other distributed computing paradigms.)

Figure 1:
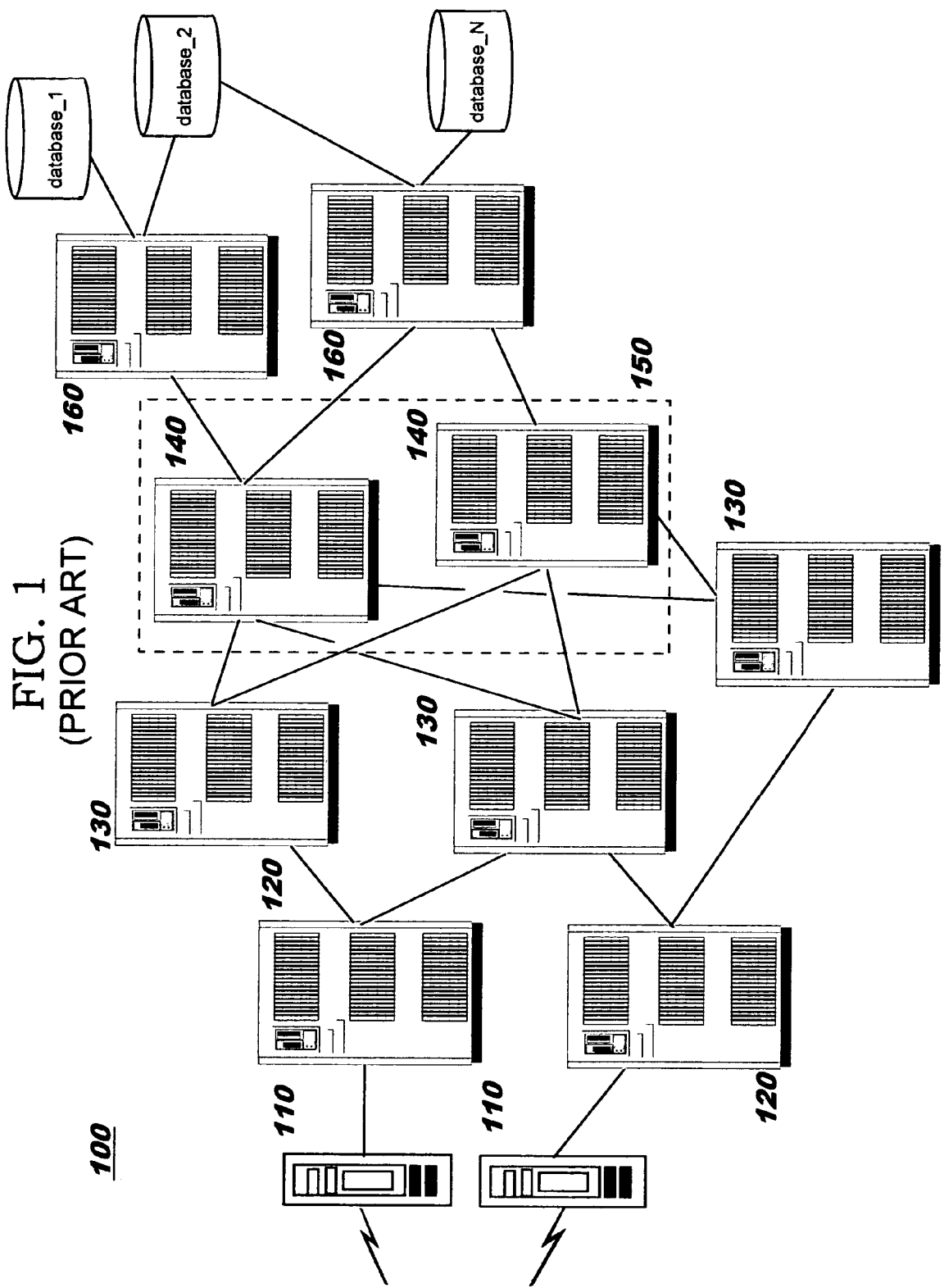
FIG. 1 is a diagram of a server site in which edge servers are located at the edge of a company's computing environment to receive incoming request messages, according to the prior art.

Use of "edge servers" in a network configuration provides increased network efficiency and availability. For example, static application components (such as images, forms, etc.) may be cached near the edge of the network, where they can be quickly returned to a requester. An edge server is a server which is physically located at or near the edge of a network. Edge servers may perform workload balancing, and are sometimes referred to as distributed web caches, surrogates, and/or proxies. (The IBM WebSphere® Edge Server, for example, performs workload balancing and also functions as a reverse proxy and/or cache server.) FIG. 1 provides a diagram of a representative server site 100 (i.e. a collection of server nodes that serve web content associated with a given fully-qualified domain name) within a network, which may (for purposes of example) serve content for a domain name such as "www.ibm.com". This example server site 100 comprises a cluster 150 of application servers 140 (such as IBM WebSphere application servers); several back-end enterprise data servers 160 (such as IBM OS/390® servers running the DB/2, CICS®, and/or MQI products from IBM); several Web servers 130 (such as Apache, Netscape, or Microsoft servers; note that the application server and Web server are often co-resident in a single hardware box); several firewalls 110; and several edge servers or reverse proxies/caches/load balancers 120. ("WebSphere", "OS/390", and "CICS" are registered trademarks of IBM.)

Web services will facilitate "just-in-time" application integration via open web-based standards, such as HTTP ("Hypertext Transfer Protocol"), SOAP ("Simple Object Access Protocol") and/or XML Protocol, WSDL ("Web Services Description Language"), and UDDI ("Universal Description, Discovery, and Integration"). HTTP is commonly used to exchange messages over TCP/IP ("Transmission Control Protocol/Internet Protocol") networks such as the Internet. SOAP is an XML-based protocol used to invoke methods in a distributed computing environment. XML Protocol is an evolving specification of the World Wide Web Consortium ("W3C") for an application-layer transfer protocol that will enable application-to-application messaging. XML Protocol may converge with SOAP. WSDL is an XML format for describing distributed network services. UDDI is an XML-based registry technique with which businesses may list their services and with which service requesters may find businesses providing particular services, using automated electronic communications. Just-in-time application integration will be possible by issuing UDDI requests to locate distributed services through a UDDI registry, and dynamically binding the requester to a located service using service information which is conveyed in a platform-neutral WSDL format using SOAP/XML Protocol and HTTP messages. (Hereinafter, references to SOAP should be construed as referring equivalently to semantically similar aspects of XML Protocol.) Using these components, web services will provide requesters with transparent access to program components which may reside in one or more remote locations, even though those components might run on different operating systems and be written in different programming languages than those of the requester. (For more information on SOAP, refer to http://www.w3.org/TR/2000/NOTE-SOAP-20000508, titled "Simple Object Access Protocol (SOAP) 1.1, W3C Note 08 May 2000". See http://www.w3.org/2000/xp for more information on XML Protocol. More information on WSDL may be found at http://www.w3.org/TR/2001/NOTE-wsdl-20010315, titled "Web Services Description Language (WSDL) 1.1, W3C Note 15 Mar. 2001". For more information on UDDI, refer to http://www.uddi.org/specification.html". HTTP is described in Request For Comments ("RFC") 2616 from the Internet Engineering Task Force, titled "Hypertext Transfer Protocol—HTTP/1.1" (June 1999).)

Figure 2:
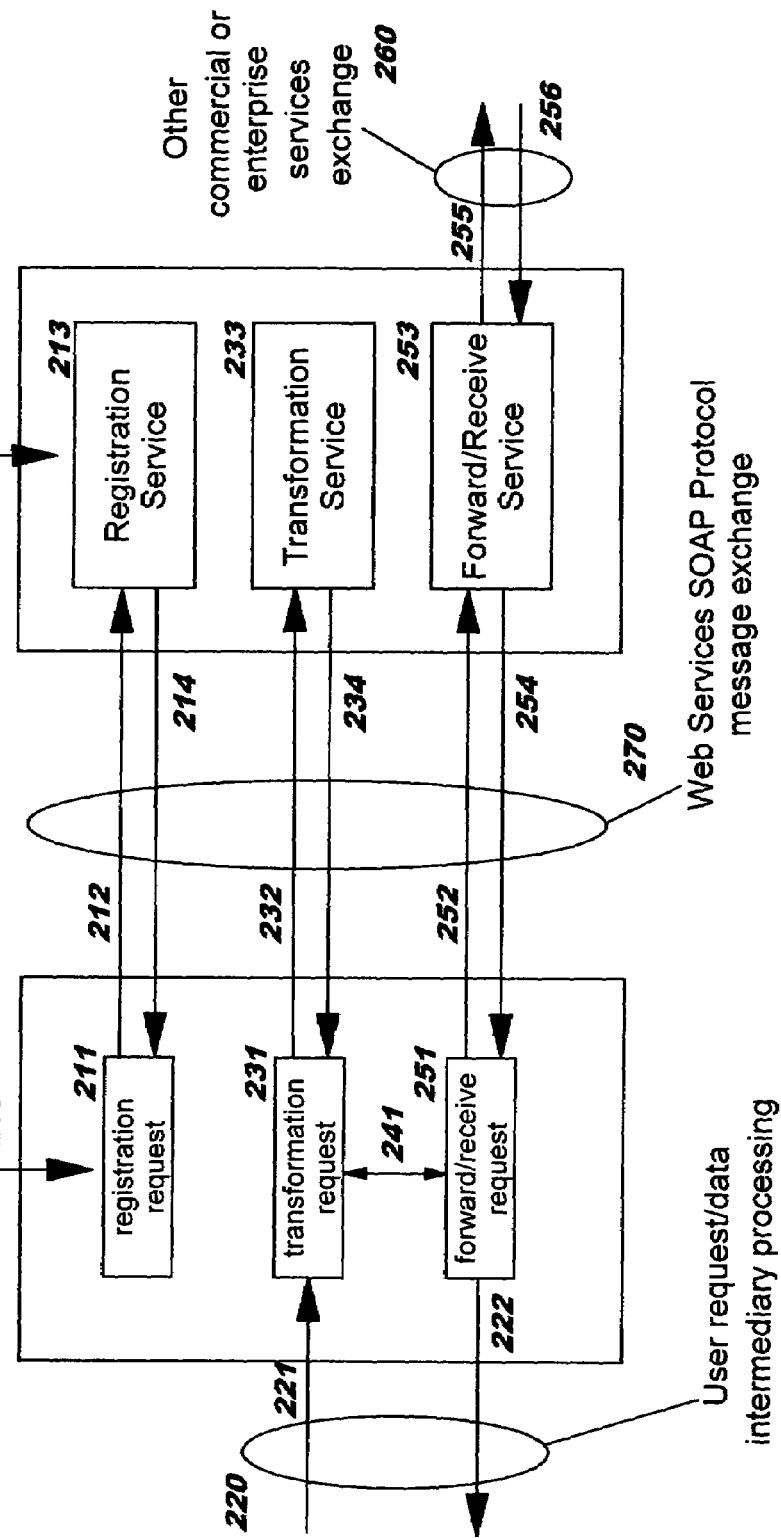
FIG. 2 provides a diagram illustrating placement and invocation of data transformation services, according to preferred embodiments of the present invention.
Figure 3:
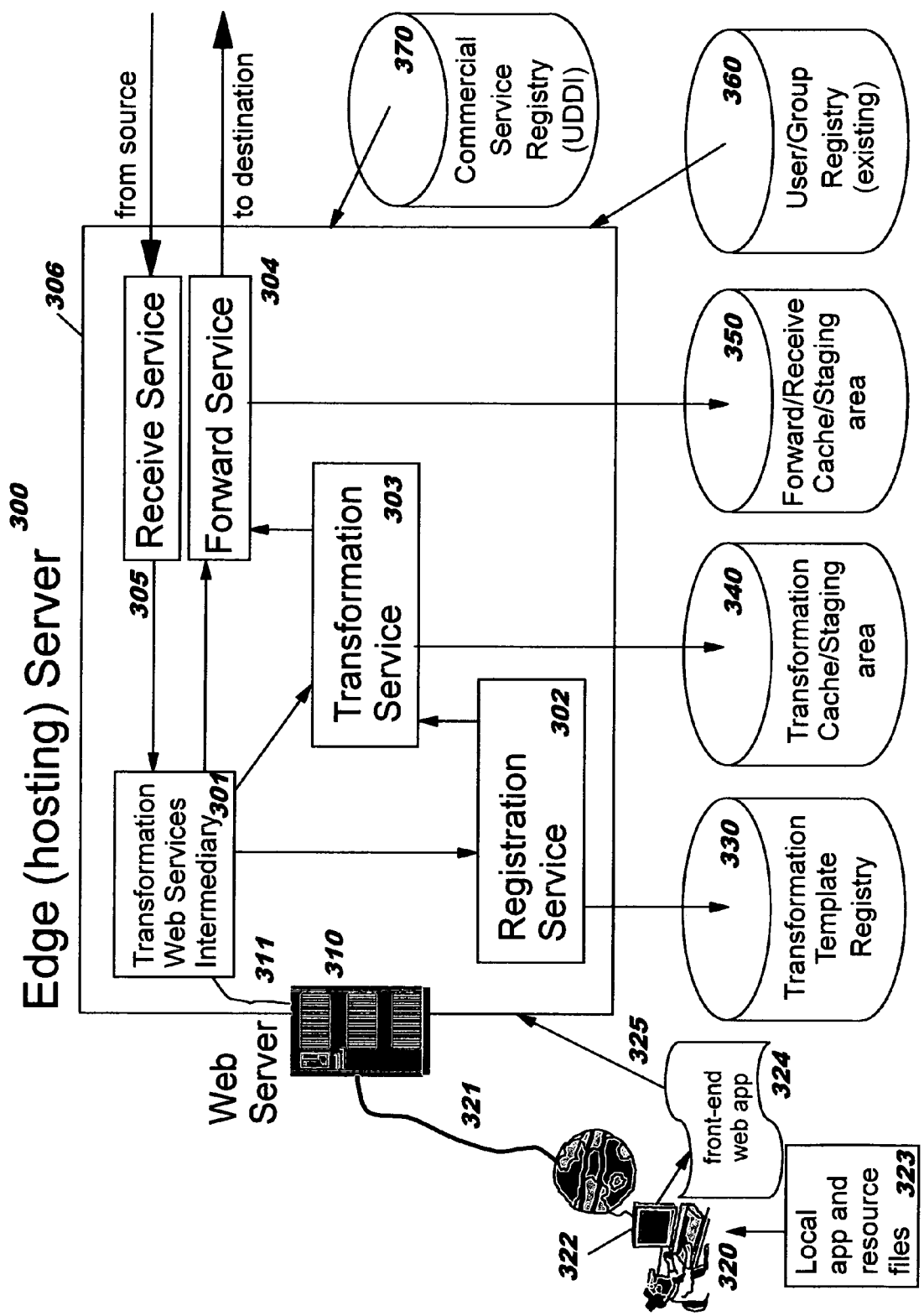
FIG. 3 provides a diagram illustrating components of the present invention and their placement and interconnection, according to preferred embodiments of the present invention.

The automated transformation services of the present invention, referred to herein equivalently as "web transformation services", may operate within a network configuration such as the sample network shown in FIG. 1, where these services may be provided on one or more of the edge servers 120 as described herein. FIGS. 2 and 3 show abstract representations of service invocations when using preferred embodiments of the present invention, and placement of components in preferred embodiments. These figures will be described in more detail below.

Providing functionality to transform the data in XML documents between a format used by one business partner and a format used by another business partner tends to be very complex and costly to implement if provided as XML transformations using application-specific software. For example, the application would be required to manage stored transformation specifications, interpret the content of incoming documents and use this information to select an appropriate transformation, apply the selected transformation, and also to address security and performance requirements. Yet, transformation is a commonly-needed task in electronic data and business message or "service" exchange. Therefore, processing improvements such as those described herein where automated transformation services are provided as network-accessible web services or e-Utilities promise to yield significant cost savings and processing efficiencies. These web transformation services will enable companies providing commercial service and/or enterprise software applications for e-Business (such as the order placement/fulfillment scenario described earlier, online shopping, cataloging services, etc.) to offload their transformation processing completely to a dedicated or third-party edge server or hosting server (or other location where such services are implemented). Developing and maintaining the core business applications will be less time-consuming without the need to address transformation issues, and less run-time resources will be consumed at the business partner's IT site by offloading this work into the network. The companies' IT professionals can then focus on the business tasks, and can use their own locally-familiar data formats and vocabulary, with only a very minimal (or no) expenditure of IT resources for interoperability concerns. (A small amount of start-up expenditure may be necessary to register with the transformation service and to adapt application programs for using web transformation services, although these tasks may also be offloaded to skilled transformation specialists in some cases. Use of the web transformation services will operate transparently after this initial work is completed.)

The web transformation services to be offered according to the present invention are system-level functions that operate independently of any particular software application, business partner, or industry. Drawbacks of prior art approaches for XML transformations, as discussed earlier, are therefore avoided. In preferred embodiments, all the services disclosed herein are preferably offered, although selected ones of these services may be offered alternatively. (Furthermore, composite services may be offered, as will be described with reference to FIG. 10.) An overview of these services will now be provided (and the services will be described in more detail subsequently). The services include:

1) Transformation template registration. This service enables a logic specification which describes one or more transformations to be registered and stored for subsequent use. These logic specifications are also referred to herein as "templates" or "template maps", and define mappings of data in one format to data in another format. Selection criteria may be associated with each registered template, if desired, to optimize the process of template selection at run-time during a transformation. The registration service preferably returns a registration handle or identifier which may be used to reference a stored template at run-time.

2) Document transformation. This service performs the actual transformation from one format to another. An input document (or, alternatively, an address or identifier which can be used to locate the document) is supplied. A registration handle that identifies a particular stored template, a template itself, or a set of key/value pairs that will enable selecting an appropriate template is also supplied. This selection criteria can specify the input document itself as the identifier of the style sheet. If so, then the input document is scanned and the appropriate style sheet is selected and applied to the input document. After the transformation is complete, the transformed document and/or a locator handle may be returned to the requester.

3) Forward a transformed document. A transformed document may be forwarded to a destination business partner using this service, on behalf of the source business partner (that is, the partner from which the input document originated). The forward service may be requested along with the transformation service, as a transform-and-forward composite service (as discussed below), or the forward service may be separately requested. In this latter case, the requester preferably supplies a locator handle to identify the stored transformed document to be forwarded.

4) Receive a transformed document. After forwarding a transformed document to a destination business partner, this service receives a response document and delivers it to the source business partner on whose behalf the transformed document was forwarded. (A transformation may also be required to prepare the response document for use by the source business partner.)

With these services, a commercial service or enterprise application can be developed quickly and easily by offloading its document transformation processing externally to a common service platform. FIG. 2 illustrates invocation of these web transformation services, according to preferred embodiments of the present invention. At setup time (see 202), a template or set of templates is registered (as shown at 210) by sending 212 a registration request 211 to a registration service 213 and (optionally) receiving a response 214 therefrom. A template provides logic specifying how to transform an XML document in a format that is local to the requester's data structure to specific formats used for external exchange with business partners. A sample template is provided in FIG. 4, described below. In preferred embodiments, service invocation requests such as request 211 are formatted as web service requests, and similarly responses are formatted as web service responses. (Note that the service requester is illustrated at 201 as the commercial service or enterprise application, although a separate registration interface which is not part of the application itself is preferably provided for registering templates.)

During mainline operations, the service or application 201 functions through an intermediary to handle user requests which are received from a user via an application-specific graphical user interface ("GUI") and the responses which are delivered for presentation to the user on the GUI, as shown at 220, by invoking the transformation service and the forward and receive services on behalf of users of service or application 201. (Note that the GUI presentation content may be the result of invoking a web transformation service.) The service or application 201 invokes transformation service 233 by sending 232 a transformation request 231, responsive to receiving an inbound flow 221 that requires transformation. In this case, the incoming user data is entered into an XML document in a local format, using existing application logic, and flow 232 comprises passing this document to transformation service 233 as a web service request. After completing the transformation, a locator handle may be returned 234 to the requesting service or application 201. This locator handle may be used by the service or application 201 to request forwarding of the transformed document to other web services, as indicated by the invocation 241 of forward/receive service 253 via a forward/receive request 251 which is transmitted 252 and the corresponding transmission 255 to a business partner's commercial service or enterprise application 260.

As an example of inbound flows, if commercial service 201 is a shopping service and the user places an order for several items from this shopping service, the incoming data comprises the details of the user's order. A transformation that may be necessary in this example is to split the overall order up into separate documents, one for each purchased item, where these separate documents are destined for separate product suppliers with which the shopping service interoperates for order fulfillment.

In an outbound flow that requires transformation, such as a document that is received 256 from business partner 260, the transformation occurs in a similar manner to that described for inbound documents, after which the transformed document is returned 254, 222 to the user. (Transformation of the outbound document may be requested by the business partner 260, or by service or application 201 using flow 241.)

In preferred embodiments, the web transformation service requests are formatted as SOAP requests, as indicated at 270. (An example will be described below with reference to FIGS. 4A and 4B.) Service or application 201 may dynamically learn of the location of the web transformation services 280, preferably by contacting a UDDI registry in which service 280 has published its service availability information. In preferred embodiments, this publish operation uses the UDDI Programmer's API ("Application Program Interface") to transmit a WSDL document for storage in a UDDI registry. (The UDDI Programmer's API may be found at http://www.uddi.org/pubs/ProgrammersAPI-V1-1.pdf, and is titled "UDDI Programmer's API 1.0, UDDI Open Draft Specification 30 Sep. 2000".) The transmitted WSDL document describes the available service, using the format specified in the WSDL specification. In addition to storing the WSDL document, provider meta-data associated with this document (such as the network location of the server which sent the WSDL document, and from which the web services can be requested) is preferably stored in the UDDI registry as well.

To illustrate a typical scenario of exchanging information between two business partners, the example of a first company which places an order and a second company which fulfills the order will be used. The exchange includes transforming the first company's order document to a format expected by the fulfillment company, forwarding the transformed document to the second company, receiving the response from the second company, and transforming the response to a local format that is usable by the first company. The application which generates the order at the first company may learn of the web transformation service 280 using UDDI message exchanges. One or more transformation templates for transforming data between this first company and its business partners will have previously been registered with the service 280, using one or more registration requests 211. The order document may be sent to the web transformation service 280 using a transformation request 231 followed by a forward request 251. Alternatively, a composite transformation service may be used, as will now be described.

Composite transformation services can be developed from the basic services of register, transform, forward, and receive. Use of a composite service may be advantageous in a web services programming model because it requires fewer message exchanges and therefore less data transfer over the network. Composite services may comprise various combinations of the basic services, such as transform and forward; forward and receive; or transform, forward, and receive. In this latter case, for example, the ordering company of the example scenario might use transform, forward, and receive to (1) request transformation of an input order document, (2) request that the transformed order document be forwarded to the order fulfillment company, and (3) request that the order fulfillment company's response be delivered to the ordering company when available. It may also be necessary to transform the response before delivering it to the ordering company. The order fulfillment company may return its response using a transform and forward service invocation, or the ordering company may invoke a transformation service request for this purpose.

In one embodiment, commercially-available web services tools may be used to provide the benefits of standards-based tools to develop an implementation of the present invention. For example, IBM's WebSphere XML and Web Services Development Environment ("WSDE") Studio may be used, along with IBM's Web Service toolkit ("WSTK"), to facilitate development of the web transformation services 280 and/or of the application/service 201. The inventive concepts disclosed herein may be extended to use with any transformation services made from discrete functional units that can be dynamically invoked in a distributed environment, including any type of e-Utility. These discrete functional units allow document transformation and similar services to be offloaded completely to a third party system (as exemplified by web transformation services 280 in FIG. 2). In preferred embodiments, functions of the web transformation services may be administered and configured programmatically, and automated logging facilities (e.g. to record message exchanges) are preferably provided as well. Logged information may be used for billing customers of the web transformation services. Billing models that may be used with the web transformation service implementation include subscription billing and pay-per-use billing. (Note that use of the present invention differs from prior art techniques whereby existing document transformation products are simply re-packaged to provide ad-hoc transformation offloading. These prior art products are often limited by their existing administrative consoles or service consoles and their predetermined resource definitions, and thus do not adapt to use within an Internet distributed computing environment where transaction processing may involve any application and any business partner in any industry that requires an easy manner of plug-and-play computing, as do the services of the present invention. For example, IBM's WebSphere Transcoding Publisher, or "WTP", version 4.0 product may be wrapped in a separate box and an HTTP request/response interface can be created to cause an XML/XSL transformation after the style sheets, selection criteria, and other information are loaded on the separate box. However, in some cases a large amount of configuration and administration work needs to be performed on the WTP console. The WTP transformation approach also has a device-based focus which is central to a particular site. This prior art approach may therefore be impractical in many cases for use among Internet partners.)

FIG. 3 illustrates components of the present invention and their placement and interconnection, showing an architecture that may be used in preferred embodiments. Edge or hosting server 300 preferably provides web transformation services 306 comprising individual services 302, 303, 304, 305 which are provided as plug-ins into a service provider infrastructure (which is preferably accessible through a protocol such as SOAP) and service provider/requester run-time environment on an application server platform. An optional intermediary program or interface 301 may be provided as a browser's interface to the web transformation services. This intermediary may be accessed 311 from request messages received at a web server 310, where these requests may have been generated upon request of a human user 320 (such as an application developer or tester, a customer of an online shopping or other e-Business service, an order clerk who enters customer orders in the example order placement scenario, etc.). The requests are typically sent 321 over the Internet or other network to web server 310 from a browser or other user agent 322 of user 320. The intermediary program 301 accepts user input, coordinates the processing of that user input, and serves as the outbound point for delivery of information to the requester. Upon receipt of an incoming request 311, the intermediary 301 uses the service requester run-time environment to invoke the requested service 302, 303, 304, 305 (or other basic or composite service). The invoked service processes the request and typically establishes supporting data structures and resource files in this process. For example, when registration service 302 is invoked, one or more files in a transformation template registry 330 are created to represent the registered template(s), and the template may be pre-compiled and stored in transformation cache or staging area 340; when transformation service 303 is invoked, a transformed document is created and is preferably stored locally in a forward and/or receive cache or staging area 350 for use with a forward service request 304 or receive service request 305 (or a composite service request which includes forward or receive). Resources produced from operation of one service may be used to support operation of other services. For example, templates registered with registration service 302 are used by transformation service 303, and transformed documents created by transformation service 303 may be forwarded to a recipient with forward service 304. Local applications and resources 323 also exist at the user's site.

When providing the web transformation services 306 using plug-ins, the existing common services of the supporting application server platform on server 300 interoperate with and support the web transformation services 306. These existing services include a user registry 360 and a commercial service registry 370. User registry 360 may be used to register individual users, user groups, companies, and so forth as being valid (i.e. authorized) customers or subscribers for the web transformation services 306 of the present invention. Service registry 370 may be a UDDI registry which contains information about availability of services from service providers in the distributed computing environment.

Intermediary program 301 may be provided, for example, as a set of web browser pages which are linked through form interactions to help users invoke the various transformation services. Use of an intermediary enables developers 320 to easily test applications for interoperability with web transformation services 306 at a third-party location, and may be implemented using wrapper code for incoming and outbound requests and responses. In addition, intermediary 301 provides a programming-free way for a business to operate a commercial service (such as that used by operator 320). For example, a mail (or e-mail) order service may be provided which accepts orders for books from its customers. When the orders are received, they need to be split out according to book publisher. Assuming the orders have been entered into a local database 323, this book order service may be provided by using off-the-shelf programming logic which converts the database 323 of orders stored in a local format into XML documents. Each order document may then be sent to server 300 over an Internet connection 321 as requests of a transform-and-forward composite service, where the document gets programmatically split by the transformation service (using one or more appropriate pre-registered transformation templates) into multiple order fulfillment documents—where, for example, each separate order fulfillment document is directed toward a different supplier (i.e. publisher). Each order fulfillment document resulting from the transformation service is then automatically forwarded to the destination supplier's order fulfillment service. An operator of this commercial service preferably issues receive service requests (or transform-and-receive service requests) to get the suppliers' responses back, again over Internet connection 321.

A similar approach may be used for automated exchanges which do not require an operator's intervention or interaction with a browser. In this case, as an alternative to using the intermediary 301 and the web browser 322 and web server 311 exchanges, a front-end web application 324 may be used to directly invoke the services 302, 303, 304, 305 of web transformation services 306 (as shown at 325). Or, executing applications may invoke these web transformation services without using additional front-end application code 324, in which case they use the web services service requester interface directly. The services provided by transformation service 306 are likely to be used by many web services service providers in this latter manner.

In preferred embodiments, maintenance services may be provided to programmatically and/or remotely perform housekeeping services for the data structures and resource files created during operation of the web transformation services of the present invention. For example, a maintenance API may be provided which allows deleting obsolete transformation templates from registry 330; revising the invalidation parameters or other information of the caching policy used for storing data in the staging areas 340, 350; increasing the storage allocated for storing templates in registry 330 or for caching documents in staging areas 340, 350; selectively purging cached documents from a staging area 340, 350; and so forth. In addition, an API preferably enables creating billing-related information such as statistics reports regarding the cached documents in a staging area 340, 350; the number of requests to be billed to customers based on entries stored in a log file (not shown in FIG. 3) or perhaps based upon service request transaction counters; etc.

An example of a transformation template is provided in FIGS. 4A and 4B. As discussed earlier, templates define one or more transformations which are to be performed on documents when criteria for applying the template are met. By way of illustration but not of limitation, templates may be provided as style sheets, as shown in the example document 400 of FIGS. 4A and 4B which provides an Extensible Style sheet Language ("XSL") style sheet. In this case, the transformations may be processed by a style sheet engine of the prior art. This example style sheet 400 specifies rules and actions for use in transforming documents containing flight information. (Interpretation of these rules and actions will be obvious to one of skill in the art, and a description thereof is not deemed necessary for purposes of the present invention.)

As an alternative to use of style sheets for templates, a stand-alone program or utility may be invoked to perform transformation from one data format to another.

Developing style sheets and other forms of transformation logic specifications requires special skills, and this function may also be offloaded from the business partners to a professional third party service such as the entity which offers the web transformation services. Professional transformation template creation services may be offered where business partners may contract for template development (and optionally registration) of templates that will perform transformations between their various data formats. The techniques of the present invention enable application developers at the business partners to be shielded from knowing and accounting for each other's data formats. For example, suppose company A produces data for interoperating with company B and company C. Professionals at the template creation service may develop transformation templates that translate from A's format to B's format, and from A's format to C's format (and, typically, for reverse transformations of data destined for company A). When sending an outbound document to the web transformation services at run-time, company A preferably also provides an identifier of the target company which allows automatically selecting the correct transformation template. (As an alternative to supplying an identifier of the target company, in some cases other criteria may be used for this purpose. The optimal way to select a transformation template will depend on the particular implementation of the present invention and the characteristics of its customers and their data. The template registration and selection approach described herein enables a flexible and generic solution to be used, as will be described with reference to FIGS. 5 and 7.)

Note that templates which have been registered by or on behalf of one company may in some cases be used for transforming documents received from other companies. Permissions or access rights may be used, if desired, to limit sharing of templates. Techniques for controlling access to stored information in this manner are well known in the art, and will not be described further herein.

Logic which may be used to implement preferred embodiments of the web transformation services will now be described with reference to FIGS. 5–10.

Figure 7:
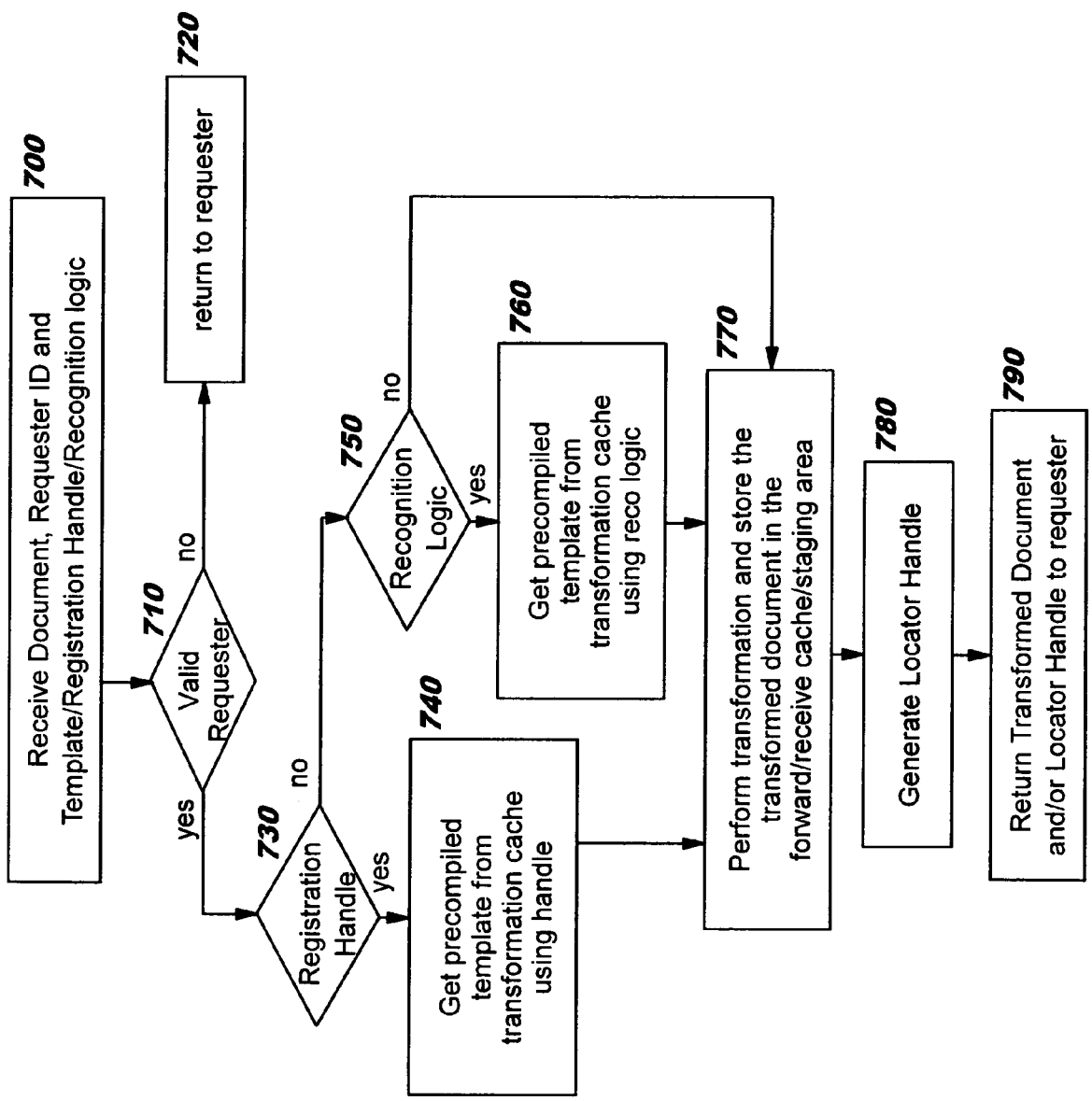

In FIG. 5, logic which may be used to implement a registration service for transformation templates is depicted. The registration process begins at Block 500 by receiving template registration information from a requester. Preferably, this information comprises a template (or, alternatively, an address or other identifier which may be used to locate a stored template), a requester identifier ("ID"), and recognition logic (or a specification of selection criteria) which may be used to determine when this template should be used. The recognition logic or selection criteria may alternatively be omitted, as the selection criteria may be contained within the template itself. For example, style sheet rules within a template may be evaluated to determine whether any of the actions specified in the style sheet are applicable. (Note that a template may also be explicitly identified on a transformation request, as shown in FIG. 7, in which case the template may be considered as implicitly registered and the use of recognition logic is therefore not required.)

The requester's ID is tested in Block 510 to determine whether this requester is an authorized and valid user of the registration service (or, alternatively, of the web transformation services as a whole). If not, then an error code or message is preferably returned to the requester (Block 520). Otherwise, processing continues to Block 530. (In alternative embodiments, validation of requesters is not strictly required for use of the services of the present invention, although in preferred embodiments this validation process is performed. For example, there may be scenarios in which any user is allowed free access to a transformation service; in such cases, validation of the service requester may not be necessary.)

A copy or image of the template is created (Block 530). For style sheets and other appropriate templates, a pre-compilation process is preferably performed as an optimization such that the template is in an executable (e.g. object) form in advance of its selection and use. The image is stored (Block 540) along with the recognition logic (if any), in the transformation registry or cache. A registration handle or identifier is then generated (Block 550) to use in identifying the stored template, and this registration handle or identifier is preferably returned to the requester (Block 560), after which the registration processing of FIG. 5 ends.

FIG. 6A illustrates a sample HTTP POST request message 600 used to transmit a SOAP message that invokes the registration service of the present invention. The XML tag 610 "registerStylesheet" provides an example of syntax that may be used to identify this as a style sheet registration request. In this example, a style sheet stored at Uniform Resource Locator ("URL") "http://localhost/temp/XML2HTML.xsl" is identified as the template being registered, as shown at 620. (This style sheet may, for example, transform XML documents to HTML pages.) A style sheet identifier having value "XML2HTML" is passed as a parameter 630 of this registration request, along with a requester ID "Administrator" 640. The style sheet identifier may be used as a selection criterion for subsequent selection of this style sheet. For example, when a transformation request is received, "XML2HTML" may be passed as a parameter to identify the desired transformation. The requester ID may be used to identify the user or entity requesting the registration service. In preferred embodiments, only authorized entities are allowed to invoke web transformation services, as discussed above.

Upon receiving a style sheet for registration, or as in the example of FIG. 6A, receiving a URL identifying a network-accessible style sheet, the style sheet is preferably pre-compiled and cached at the server on which the web transformation services are provided. If the registration is successful, a handle or other identifier is preferably returned to the requester. FIG. 6B illustrates a sample HTTP response 650 that may be issued after processing the registration request 600 of FIG. 6A. In this example response 650, XML tag 660 "registerStylesheetResponse" is an example of syntax which may be used to identify this as a style sheet registration response, and a style sheet identifier is returned as a parameter 670 to confirm that "XML2HTML" has been successfully registered.

FIG. 7 illustrates logic which may be used to implement the transformation service. The process begins at Block 700 where the service receives an input document (or, alternatively, an address or reference which enables locating the document), the requester's ID, and one of (i) a template to use in the transformation, (ii) a registration handle or other identifier of a previously-stored template, or (iii) parameter values for matching against previously-stored recognition logic to select a stored template. The optional requester information is validated (Block 710), and if invalid, an error message or code is preferably returned (Block 720) to the requester. Otherwise, when the requester passes the validation, Block 730 checks to see if a registration handle was passed as input. If so, then this handle is used to select and retrieve a pre-compiled template from the transformation cache (Block 740), and processing continues to Block 770. When a registration handle was not passed, Block 750 checks to see if values to use with recognition logic were passed. If so, then these values are used to retrieve a stored template (Block 760); otherwise, the depicted logic assumes that a template was passed, and control transfers directly to Block 770 to apply this template. (If desired, an additional test may be implemented when Block 750 has a negative result to determine whether a template was in fact passed, and if not, an error message may be generated and returned to the requester.)

As an example of using values with recognition logic, a parameter value might be passed on the transformation service request which identifies a target recipient of the document to be transformed. If a template has been registered which uses company identifier as a selection criterion, and if this passed parameter value matches one of the values which may have been specified as an appropriate value for the company identifier during the registration process, then this template may be selected. Selection criteria and/or values may be used to organize stored templates for efficient retrieval, if desired. Such organization techniques will be obvious to one of skill in the art, and do not form part of the inventive concepts of the present invention.

Another example of recognition logic is as described in commonly-assigned U.S. patent application Ser. No. 09/754,891, filed Jan. 5, 2001, which is titled "Techniques for Automating e-Business Services", where the characteristics of a document are described to allow the transformation processing to examine the document to find a matching transformation template to apply. The description might include such items as element names with associated XPath information and attribute values, and provides a more flexible and powerful mechanism than use of simple keyword parameters. (XPath is defined in a specification titled "XML Path Language (XPath), Version 1.0", W3C Recommendation 16 Nov. 1999, which is available on the Internet at http://www.w3.org/TR/xpath.) XPath statements may, for example, be passed as selection criteria when a style sheet or other template is registered, and are then available for later use in automatically scanning and identifying the proper style sheet to be used for a particular input document that is to be transformed.

Upon reaching Block 770, the transformation template has been identified or selected. This template is applied to the input document to transform it appropriately. In preferred embodiments, the resulting document is then stored in the forward/receive cache or staging area. A locator handle is generated (Block 780), and this handle is preferably returned to the requester (Block 790). In addition to or instead of the locator handle, the transformed document may be returned to the requester. This invocation of the transformation processing of FIG. 7 then ends.

Figure 8:
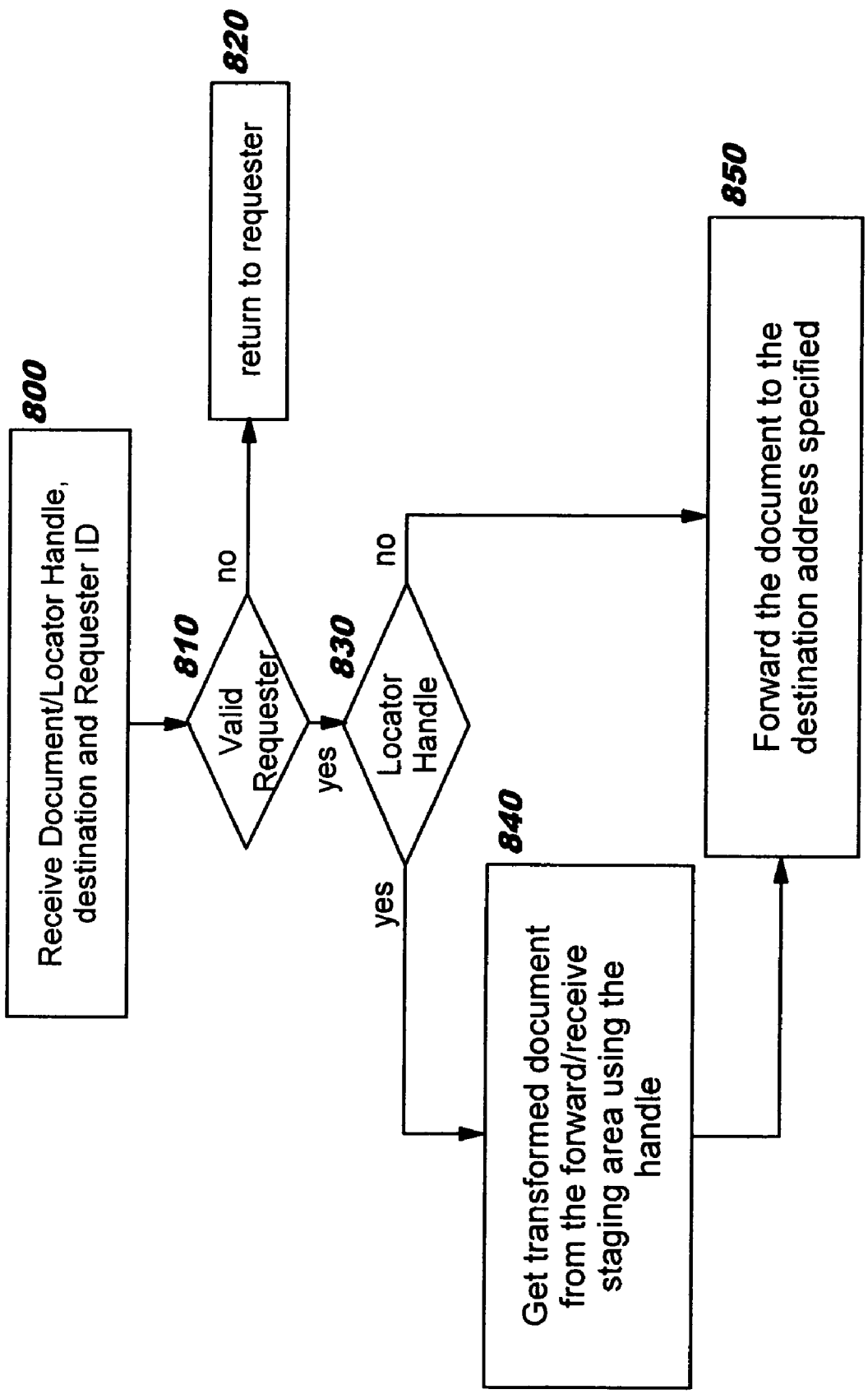

FIG. 8 depicts logic which may be used to implement the forward service for transformed documents. Input parameters to this service preferably comprise a transformed document or locator handle which may be used to identify a transformed document, an identification of the destination for the document, and an identifier of the service requester, as shown at Block 800. The requester's ID is validated in Block 810, and if invalid, an error indicator is preferably returned to the requester at Block 820. Otherwise, Block 830 checks to see if the input parameter was a locator handle. If so, then this value is used to retrieve a transformed document from the forward/receive cache (Block 840). After retrieving the transformed document, or when a transformed document was passed as input (and the test in Block 830 therefore has a negative result), Block 850 forwards the document to the destination using the destination identifier passed as input. Preferably, an identifier such as an IP address of the destination is used. Optionally, a status message may be returned to the requester indicating the completion of the forward service (not shown).

Note that while preferred embodiments are described herein in terms of transforming a document through invocation of a web transformation service, and then forwarding this transformed document through invocation of another web transformation service, in alternative embodiments the techniques of the present invention might be used only for the transformation, and the requester might subsequently forward a transformed document in another manner.

Figure 9:
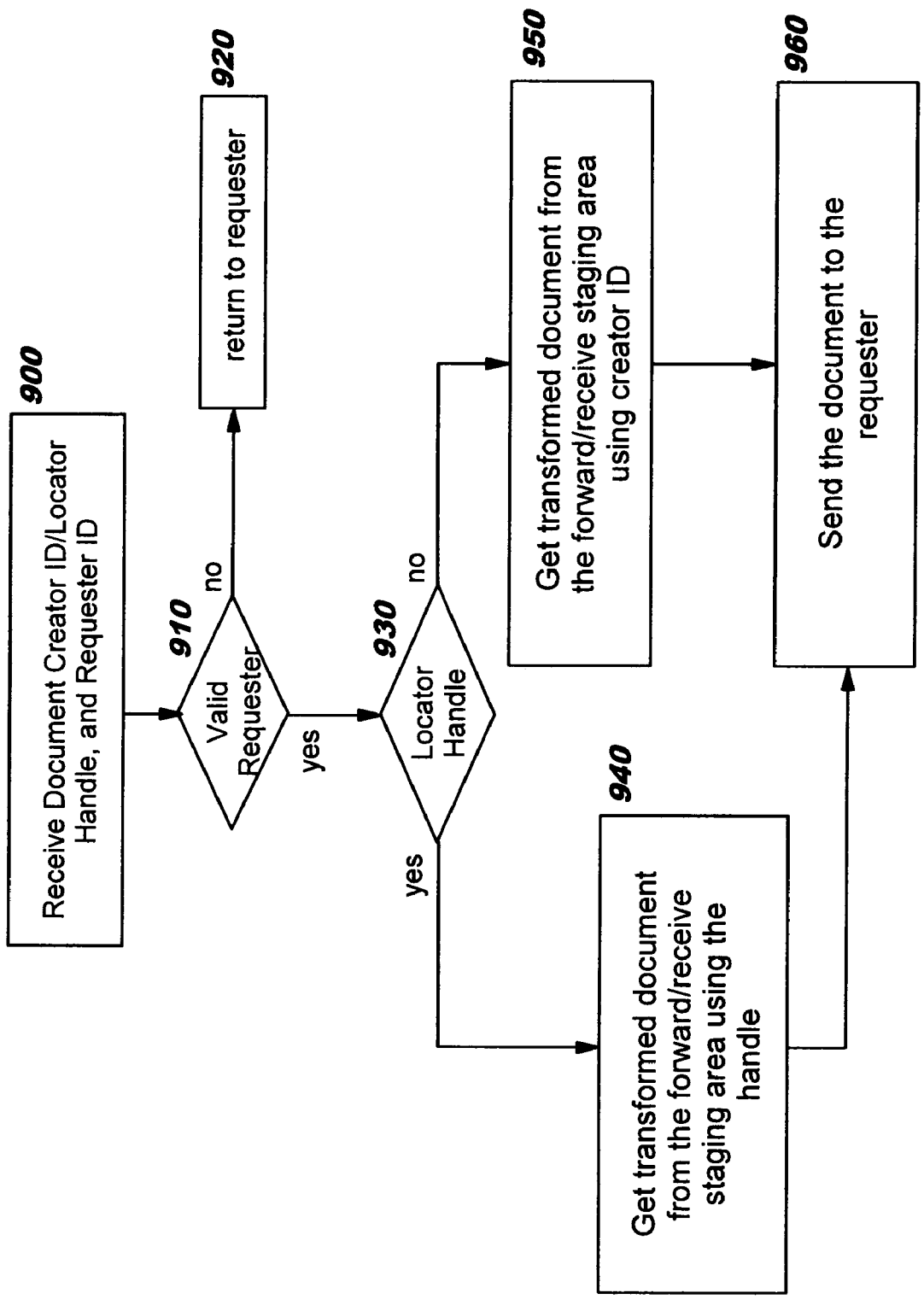

Logic which may be used to implement a receive service is depicted in FIG. 9. The receive service may be invoked along with a forward service or a transformation service. For example, a requester may register a template, and then request a transformation using this template followed by a receive service request that will get the result from the transformation back for analysis as the requester determines how to proceed. Communicating source and destination business partners may always exchange messages using transformation and forward service requests in both directions. However, an alternative scenario is for a destination to push a response to a source using, for example, either an identity transformation (that is, one which does not transform the data) or no transformation to store a response document in the forward/receive staging area, and then passing a locator handle of the pushed response document to the source. The source can then use this locator handle on a receive service to get the response document. In alternative embodiments, a post-and-wait approach may be used whereby a source requests a document from the staging area that has not yet been received. In this case, an address of the response creator and selection criteria (or a template) can be specified together in a receive service invocation, and the document will be transformed and sent to the partner issuing the receive service request upon arrival.

Input to the receive service preferably comprises an identifier of the document creator or a locator handle and a requester ID, as shown at Block 900. Block 910 checks to see if the requester is valid, and if not, Block 920 may return an error indicator to the requester. Otherwise, Block 930 checks to see if the document to be received was identified by a locator handle. If so, this handle is used in Block 940 to retrieve the document from the forward/receive staging area, and if not, the document creator ID is used to locate the document in Block 950. After locating the document, it is returned to the requester (Block 960), and the processing of the receive service is complete.

Figure 10:
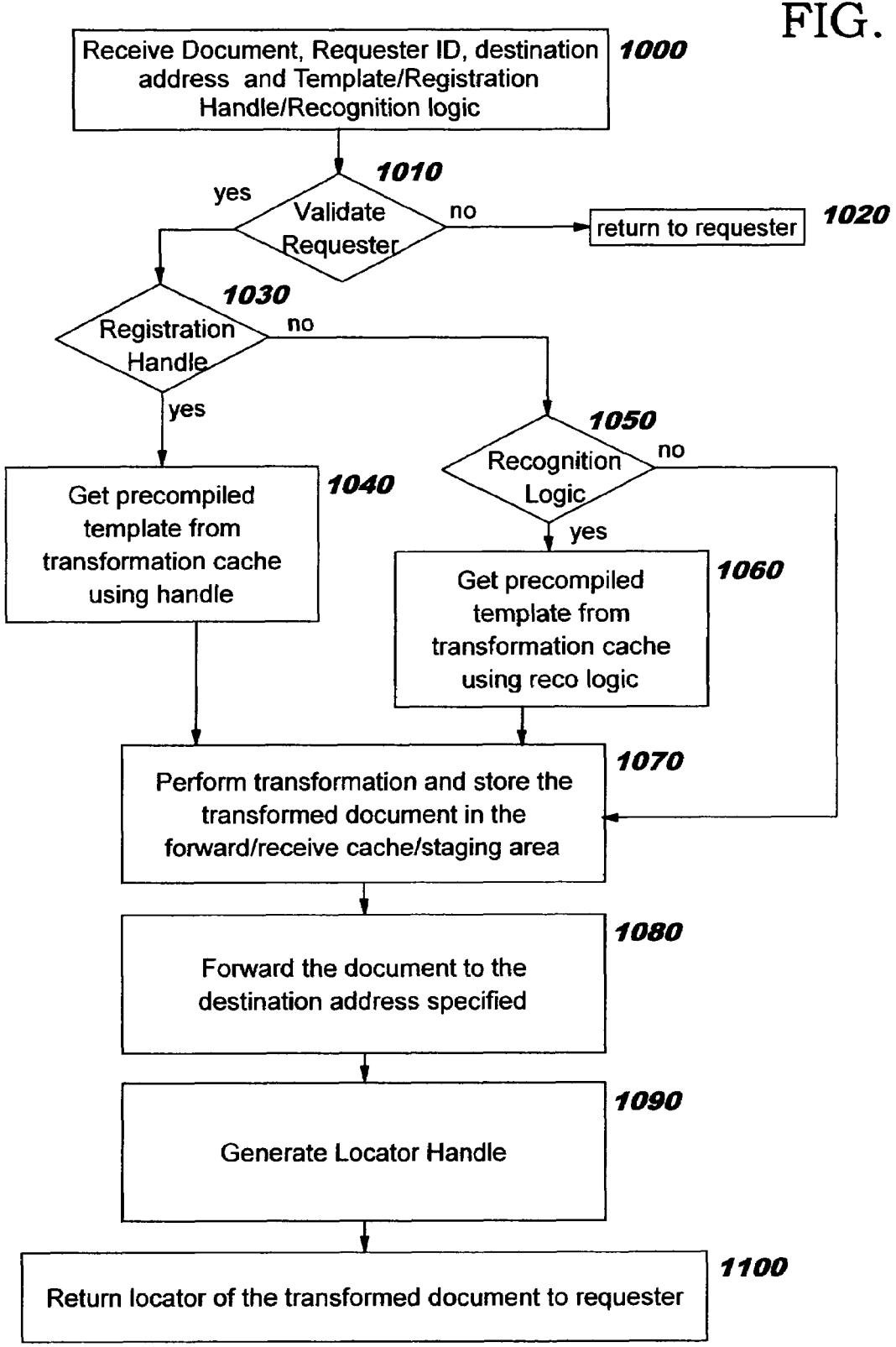

FIG. 10 provides an example of a composite service, and in this case represents a transformation and forward service on an input document. Input to the service is received at Block 1000, and may include an input document (or an address or identifier which may be used to locate this document), a requester ID, a destination address, and a means for locating the template to be applied (such as providing the template, specifying a registration handle of a previously-registered template, or providing key/value pairs that may be used with previously-stored recognition logic to dynamically select a template). Block 1010 validates the requester, and Block 1020 preferably sends a error indication to the requester if this validation fails.

When the validation succeeds, Block 1030 checks to see if the requested template was identified using a registration handle. If so, then this handle is used in Block 1040 to locate the template in the transformation cache, and processing continues to Block 1070. When the template was not identified using a registration handle, Block 1050 checks to see if key/value pairs to match against selection criteria or recognition logic were provided. If so, then Block 1060 retrieves a template from the transformation cache using these values and processing continues to Block 1070. When the template was not identified using a registration handle or key/value pairs for recognition logic, then FIG. 10 assumes that a template was explicitly provided and control transfers directly to Block 1070.

Block 1070 performs the appropriate transformation on the input document, and preferably stores the result in the forward/receive staging area. The document is then forwarded to the identified destination (Block 1080), and a locator handle is preferably generated to identify the transformed document (Block 1090). This locator handle may be returned to the requester (Block 1100), after which this composite service is complete.

As has been demonstrated, the web transformation services of the present invention provides a flexible, efficient technique for transforming data and services and allows commercial service and enterprise applications to offload their transformation processing to third-party transformation services which are preferably located at the edge of the network (and which may operate a dedicated transformation service or a hosting service). The offloaded transformations may then be accessed dynamically, at run-time, preferably using a web services paradigm. The environment in which the web transformation services operate is independent of the environment used by the requesters. A base set of transformation services were described, and are preferably remote administrable and configurable, and may operate by plugging in to existing system platforms. Composite services were described which may be created from these base services. An intermediary was described, which enables turn-key operations for invoking the web transformation services from a browser or similar user agent. This intermediary also facilitates developer testing. Service wrapper code may be used to allow for easy invocation by other services. Professional transformation services may be offered using the web transformation services disclosed herein to serve customers in a distributed computing environment. Professional template creation services may also be offered to create templates for use in operation of these web transformation services.

Edge servers represent one application platform on which the disclosed web transformation services may operate, and are described herein for purposes of illustration and not of limitation.

While preferred embodiments of the present invention enable use of the web transformation services to be applied to any industry, as previously stated, it may be preferable in some cases to provide web transformation services within a specialized market, such as banking or order procurement. This approach may perhaps enable more efficient use of the skills of the transformation specialists.

As will be obvious, semantically similar components may be substituted for those described herein without deviating from the scope of the present invention. For example, SMTP ("Simple Mail Transfer Protocol") flows may be used instead of HTTP flows in some embodiments, and while SOAP is the preferred standard messaging format for invoking web services, alternative protocols such as XML Protocol may be used.

As will be appreciated by one of skill in the art, embodiments of the present invention may be provided as methods, systems, or computer program products. Accordingly, the present invention may take the form of an entirely hardware embodiment, an entirely software embodiment or an embodiment combining software and hardware aspects. Furthermore, the present invention may take the form of a computer program product which is embodied on one or more computer-usable storage media (including, but not limited to, disk storage, CD-ROM, optical storage, and so forth) having computer-usable program code embodied therein.

The present invention has been described with reference to flowcharts and/or block diagrams of methods, apparatus (systems) and computer program products according to embodiments of the invention. It will be understood that each flow and/or block of the flowcharts and/or block diagrams, and combinations of flows and/or blocks in the flowcharts and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart flow or flows and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart flow or flows and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart flow or flows and/or block diagram block or blocks.

While the preferred embodiments of the present invention have been described, additional variations and modifications in those embodiments may occur to those skilled in the art once they learn of the basic inventive concepts. Therefore, it is intended that the appended claims shall be construed to include both the preferred embodiments and all such variations and modifications as fall within the spirit and scope of the invention.

What is claimed is:

1. A method of automatically transforming data or business messages between communications parties in a computing network, comprising steps of:
   detecting, by a first application program, that a data or business message is to be exchanged with a second application program, wherein a first data format used by the first application program for the data or business message is different from a second data format used by the second application program;
   identifying, by the first application program, a network-accessible transformation service from which transformations are dynamically requestable; and
   sending, by the first application program, a transformation request to the identified network-accessible transformation service, wherein the transformation request requests the network-accessible transformation service to transform the data or business message from the first data format to the second data format and identifies a transformation template to be used, by the network-accessible transformation service, to perform the requested transformation.

2. The method according to claim 1, further comprising the step of requesting, by the first application program, delivery of a transformed document from the network-accessible service to the second application program, wherein the transformed document results from the requested transformation.

3. The method according to claim 1, wherein the transformation template is identified on the transformation request by specifying an identifier of a particular transformation template previously registered with the network-accessible transformation service.

4. The method according to claim 1, wherein the transformation request specifies a location from which the network-accessible transformation service can obtain the data or business message.

5. The method according to claim 1, wherein the transformation request further comprises the data or business message.

6. The method according to claim 5, wherein the data or business message is specified using a structured document.

7. The method according to claim 1, wherein the transformation template is identified on the transformation request by specifying the transformation template therein.

8. The method according to claim 1, wherein the transformation template is identified on the transformation request by specifying parameter values usable for selecting, by the network-accessible transformation service, the transformation template from among a plurality of previously-registered transformation templates.

9. The method according to claim 1, wherein the transformation template is identified on the transformation request by specifying an address usable for locating, by the network-accessible transformation service, the transformation template.

10. The method according to claim 1, wherein the identifying step further comprises discovering, by the first application program, the network-accessible transformation service by consulting services registered in a network-accessible service registry.

11. The method according to claim 10, wherein the network-accessible service registry is a Universal Description, Discovery, and Integration registry.

12. A system for communicating between application programs in a computing environment, comprising:
- means for detecting, by a first application program, that a data or business message is to be exchanged with a second application program, wherein a first data format used by the first application program for the data or business message is different from a second data format used by the second application program;
- means for identifying, by the first application program, a network-accessible transformation service from which transformations are dynamically requestable; and
- means for sending, by the first application program, a transformation request to the identified network-accessible transformation service, wherein the transformation request requests the network-accessible transformation service to transform the data or business message from the first data format to the second data format and identifies, from among a plurality of transformation templates previously registered with the network-accessible transformation service, a selected one of the transformation templates to be used, by the network-accessible transformation service, to perform the requested transformation.

13. The system according to claim 12, further comprising means for requesting, by the first application program, delivery of a transformed document from the network-accessible service to the second application program, wherein the transformed document results from the requested transformation.

14. The system according to claim 12, wherein the transformation request specifies a location from which the network-accessible transformation service can obtain the data or business message.

15. The system according to claim 12, wherein the transformation template is identified on the transformation request by specifying the transformation template therein.

16. The system according to claim 12, wherein the transformation template is identified on the transformation request by specifying an address usable for locating, by the network-accessible transformation service, the transformation template.

17. A computer program product comprising at least one computer useable media, the media embodying computer-usable program code for communicating between application programs in a computing environment, the computer program product comprising:
- computer-usable program code for detecting, by a first application program, that a data or business message is to be exchanged with a second application program, wherein a first data format used by the first application program for the data or business message is different from a second data format used by the second application program;
- computer-usable program code for identifying, by the first application program, a network-accessible transformation service from which transformations are dynamically requestable; and
- computer-usable program code for sending, by the first application program, a transformation request to the identified network-accessible transformation service, wherein the transformation request requests the network-accessible transformation service to transform the data or business message from the first data format to the second data format and identifies, from among a plurality of transformation templates previously registered with the network-accessible transformation service, a selected one of the transformation templates to be used, by the network-accessible transformation service, to perform the requested transformation.

18. The computer program product according to claim 17, wherein the transformation template is identified on the transformation request by specifying an identifier of a particular transformation template previously registered with the network-accessible transformation service.

19. The computer program product according to claim 17, wherein the transformation request further comprises the data or business message.

20. The computer program product according to claim 17, wherein the transformation template is identified on the transformation request by specifying parameter values usable for selecting, by the network-accessible transformation service, the transformation template from among a plurality of previously-registered transformation templates.

* * * * *